Oct. 8, 1929.  A. C. BROWN  1,730,601
FAUCET
Filed Oct. 7, 1921
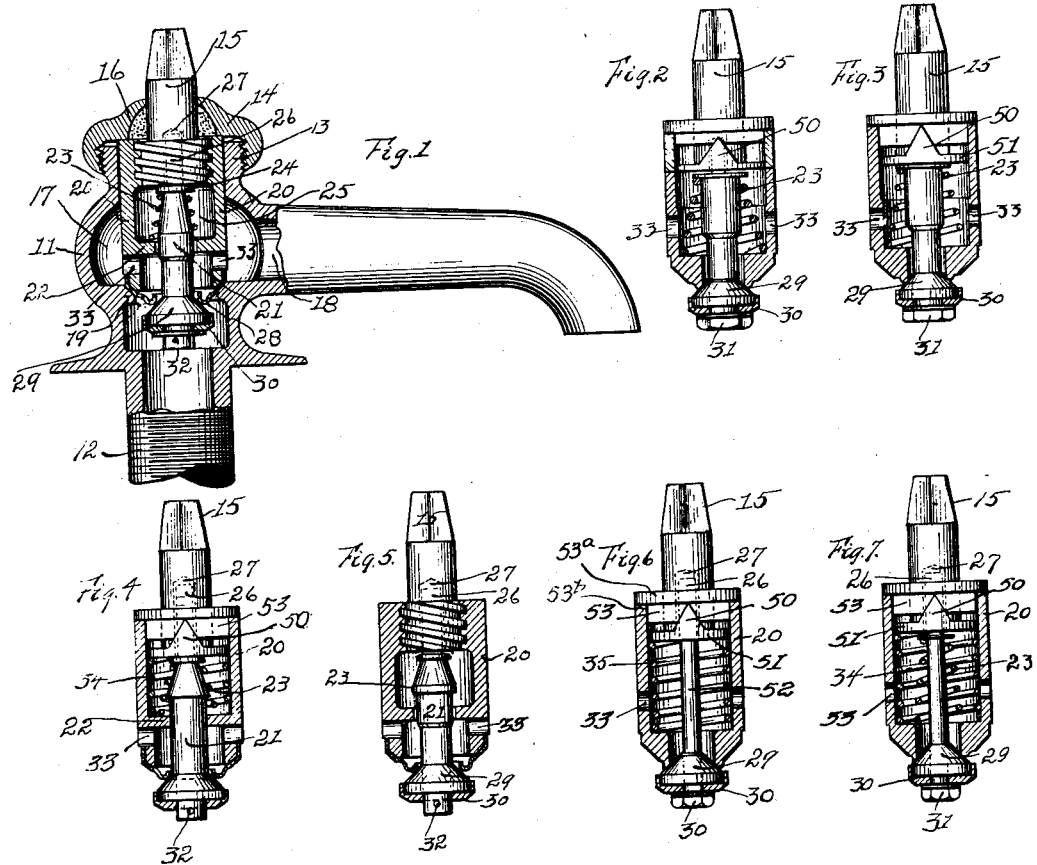
Inventor:
Albert C. Brown.
By
Attorney Patented Oct. 8, 1929

1,730,601

UNITED STATES PATENT OFFICE

ALBERT C. BROWN, OF CHICAGO, ILLINOIS

FAUCET

Application filed October 7, 1921. Serial No. 506,087.

My invention has for its object the production of a faucet or valve designed to be used in sinks, lavatories, tubs and other places where required, in connection with a water system or liquids under pressure, and has for its principal object the production of complete working valve units, interchangeable for valve bodies, which embodies a detachable seat and valve washer, thereby enabling repairs to be made by simply removing the unit and replacing with a new one, when the removed unit may be repaired and used over again.

It is also an object of my invention to provide a slidably engaging two-piece valve stem, the inner piece or part of which has a spring tension guidance whereby the structure closes automatically when pressure of outer piece or part of valve stem is released, it being understood that this faucet closes with the pressure.

A further object of my invention is to provide a more simple means for locking the valve washer on the stem with a cotter pin, which can be quickly removed instead of having a screw or nut on the valve stem which wears out, making the stem useless.

A further object of this invention is to provide a stamped seat which is attached to the sleeve and in this construction is tapered to coincide with the lower contour of the sleeve, and also to provide an outer stem which is machined to receive and actuate the slidable projecting inner stem interiorly or inside of the sleeve against the tension of the spring and pressure.

I have found this construction of valve unit to be as efficiently used upon faucets arranged in a vertical or in a horizontal position and therefore contemplate utilizing the unit with either form of construction.

It is also an object of my invention to provide a self-closing faucet or valve in which the seating or closure is effected upwardly and entirely independent of the action of the opening mechanism. To accomplish this I employ a heavy spring to return the cam to normal closed position and a lighter spring to close the valve with the assistance of the water pressure. I accomplish this purpose by using a two-piece valve stem in order that I may use a spring strong enough to turn the cam and handle to normal closed position without causing the mechanism to "hammer" or in fact without having any effect on the closing of the faucet or valve seat.

It is a further object of my invention to provide a mechanism with which a compression type faucet or valve, as hereinafter described, can be changed into a self-closing faucet or valve without disturbing or altering the body of said faucet or valve.

In this invention I have developed features of construction which I consider a decided improvement over faucets as heretofore manufactured including that of my earlier Patent No. 1,148,441, the features of advantage in this construction residing specifically in having a stamped seat which is stronger, easily removable and can be made at less expense; the swivel valve washer prevents any grinding action; the spring closure eliminates strain on the seat and valve washer which is due to forcing the handle; the automatic closing of the valve after the handle passes a certain point and before it comes to the stopping point insures positive shut-off, the possible cutting of the valve seat due to the usual forcing of the handle when any foreign matter has found lodgment in the seat washer, is eliminated in this construction by means of the spring closure; in this instance the handle operates always in the same arc of the circle, and is not affected by wearing or indentation of the valve washer and by using a cotter pin to secure the washer and washer retainer, there are no threads to strip.

In the accompanying drawings I have illustrated what I now consider the preferred form of the essential features of my invention, with certain modifications, and in these drawings:—

Fig. 1 is a vertical sectional view of a faucet embodying my invention,

Figs. 2-3-4-5-6-7 are sectional views of different forms of valve units, closing with the pressure, Fig. 8 is a modified form of cam.

To illustrate my invention, I have shown a faucet body or valve casing 11, which is preferably threaded as at 12 for engagement with suitable pipe connections, or the like, having communication with a liquid or fluid supply. A portion 13 of the body 11 is preferably threaded to receive a cap 14, which is apertured to receive a valve control stem or outer stem 15. A suitable packing material 16 may be provided to prevent leakage around the stem 15. The body 11 is formed to provide a valve chamber 17, which is divided by an apertured separating wall 19 into a supply chamber and exhaust chamber. A faucet outlet 18 communicates with an outlet portion of the chamber 17 and may be formed as shown, or adapted to receive pipes or other suitable conductors for conducting the liquid away from the valve.

A chambered sleeve or bushing 20, which may be of any suitable material, is formed, and preferably machined, to have a close fit in the portion 13 of the body 11 and to extend through the exhaust portion of the chamber 17 and engage the dividing wall 19. Any suitable valve seat may be secured to, or carried by, the bushing 20, and in the present instance I have shown one end of the body 20 and the separating wall 19 formed to embrace a seat 28, which may be of any suitable form and material and adapted for attachment to the bushing 20 to provide a seat for a valve gasket or washer 29. The valve gasket 29 may be attached to any suitable plunger or operating device, and in the present instance, I have shown a plunger or inner stem 21 formed to extend through a dividing wall 22 in the bushing 20 and having sliding engagement therein, to which the gasket 29 may be secured in any suitable manner, and in the present instance I have shown the gasket positioned over the stem 21 and supported by a cup 30. A cotter pin 32, or the like, extending through the stem 21, secures the stem and the gasket in assembled relation. In the present embodiment, the inner stem, or plunger 21 is preferably formed for telescoping engagement with the outer or control stem 15. To accomplish this, the plunger 21 is provided with an extension 26 of reduced diameter, adapted to fit within a socket 27 in the stem 15, and is further provided with a flange 24, or may be otherwise suitably arranged or formed to provide an abutment against which the stem 15 may engage for moving the plunger 21 in a valve-opening direction. Yieldable means is preferably provided for returning the plunger 21 to closed position, and to accomplish this I have shown a spring 23 engaging the flange 24 and the separating wall 22 of the bushing 20, which is formed to urge the plunger toward closed position. A second spring 34 (Figs. 4 and 7) may be provided, if desired, for urging the stem 15 toward closed position.

The upper end of the stem 15 may be formed in any suitable manner to receive any suitable device or handle for controlling the stem. When the stem is rotated or actuated to move the plunger downwardly, the valve gasket 29 is moved away from the seat 28 and fluid passes around the stem or plunger 21 into the bushing 20. A plurality of apertures 33 are provided in the wall of the bushing and the fluid passes therethrough and into an exhaust chamber and then through the outlet 18. In closing the valve, the operating stem is rotated in one direction, when the spring 23, reinforced by the fluid pressure, seats the gasket 29 against the seat 28 and closes the valve. It will be noted that the outer or operating stem 15, the inner stem or plunger 21, the bushing 20, the seat 28, and the cap 14 are all assembled as a unit and are removable as such from the valve body 11. This permits the ready substitution of one unit for another to permit of repairs without delaying the use of the valve or tying up the system in which the valve is connected. It will be further noted that while the preferred form of stem 15 is that shown in Figure 1, having threaded engagement in the bushing 20, this construction may be rearranged to suit conditions of either construction or operation, such as shown in Figs. 2, 3, 4, 6, 7 and 10, where a cam arrangement is provided, which will be later described, for moving the valve plunger 21, and that with either arrangement it is impossible for an operator to force or jam the gasket against the seat and thereby reduce the life of the gasket and that fluid may be utilized to assist the spring means for closing the valve.

The construction shown in Figs. 2, 3, 4, 6 and 7 includes a cam 50 formed on a collar 51, which may be integral with or attached to the valve stem 15. The cam 50 is functionally cooperative with an oppositely formed cam portion 53 of the member 53$^a$. The member 53$^a$ carrying the companion cam 53 loosely surrounds or engages the valve operating stem 15 and is immovably held in engagement with the sleeve 20 by a cap, as for example, as shown in Fig. 1. The under side of the collar 51, shown in Figs. 4, 6 and 7, provides a seat for a coil spring 35, which is preferably of sufficient strength to carry the cam 50 back to normal position after the handle of the faucet has been released. It will be noted that the closing of the faucet is entirely independent of the action of the opening mechanism.

The structure shown in these figures constitutes units which may be readily substituted for the valve unit shown in Fig. 1 and without change of the faucet body spout or attaching portion 12.

Fig. 8 is a detail of cams arranged in a position opposite to that shown in Figs. 2–3–4–6 and 7. In this case the valve operating stem 15 has a socket 64 formed in the lower end thereof to receive the lower stem, not shown, and has formed integrally thereon an enlarged portion or collar 65 in which are grooves or notches 66. Surrounding this operating stem is a loosely fitting collar 67 having cams 68 which operate in grooves 66. The cam and grooves in this construction cooperate in substantially the same manner as the cams and grooves in the arrangement shown in other figures.

I claim:—

1. A faucet including in combination with the body thereof a removable unit comprising a sleeve removably positioned within the body, an inner stem, an outer stem for actuating said inner stem, both said stems being carried by said sleeve, a valve seat on said sleeve, a valve on said inner stem, a spring acting on said inner stem to bring said valve into engagement with said valve seat and a spring acting on said outer stem and urging it towards normal inoperative position.

2. A faucet including in combination with the body thereof a removable valve unit structure comprising a sleeve, a valve stem supported therein having telescoping sections, a valve seat on said sleeve and springs of different tension surrounding and engaging the valve stem to close the valve independently of the water pressure.

3. A faucet including in combination with the valve body thereof a removable valve unit structure comprising a sleeve, telescoping outer and inner valve stems, a collar carried on the inner stem, a cam on the outer stem adapted to engage a groove in an oppositely facing collar on the sleeve and surrounding the outer stem, a spring surrounding the inner stem to move the cam to normal position and another spring surrounding the inner stem, and engaging the collar on said stem to close the valve.

4. A faucet including in combination with the valve body thereof, a removable valve unit structure comprising a sleeve, a valve stem comprising telescoping sections, springs of different tension for actuating said valve stem sections, a valve seat on the inner end of the sleeve, a washer on the inner valve stem section for co-operating with said valve seat, a retainer having a circular recess receiving said washer and means for retaining the washer and retainer in position.

In testimony whereof I have signed this specification.

ALBERT C. BROWN.